Aug. 25, 1931.  F. G. WITHROW  1,820,721
BRAKE ROD ANTIRATTLER
Filed Oct. 21, 1929
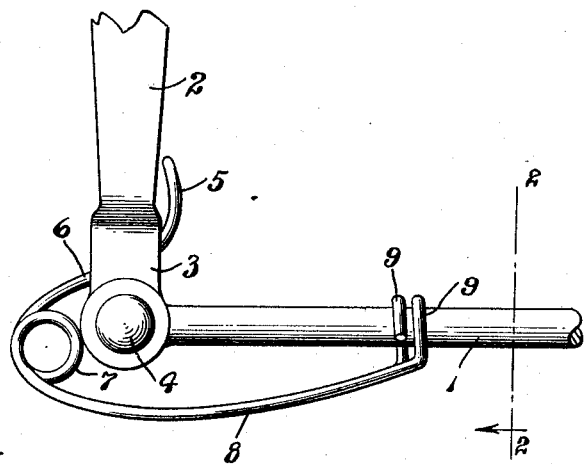
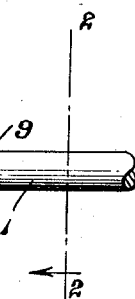
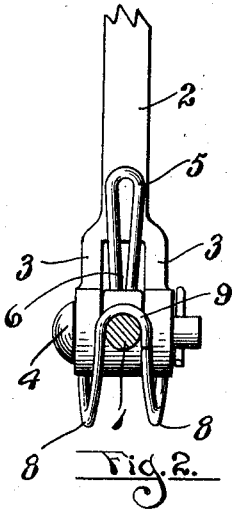
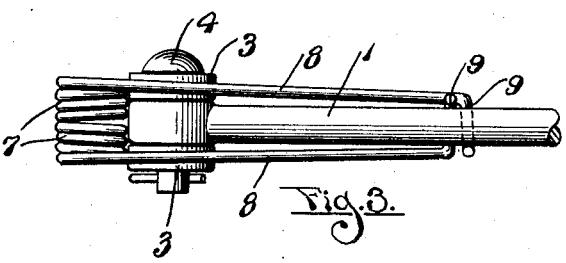
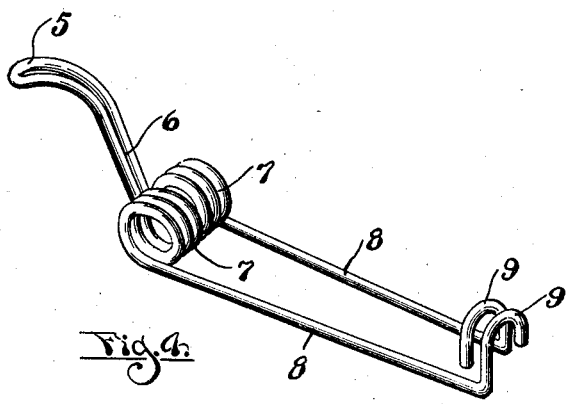
Inventor
Floyd G. Withrow
By Liverance &
Van Antwerp
Attorneys Patented Aug. 25, 1931

1,820,721

UNITED STATES PATENT OFFICE

FLOYD G. WITHROW, OF GRAND RAPIDS, MICHIGAN

BRAKE ROD ANTIRATTLER

Application filed October 21, 1929. Serial No. 401,339.

This invention relates to an anti-rattler or silencing device which in use may be applied adjacent the end of a brake rod where it has pivotal connection with a lever used to operate a brake to contract the same or to permit its expansion, or vice versa. There are, of course, many other relations where the device may be used, it being generally applicable to a pivot joint between a rod and a lever having a forked end which embraces the end of the rod, such joint being liable to rattle and make undesirable noise particularly when worn after service for some time.

The present invention is directed to a very simple, practical construction which may be applied almost instantly to the joint between the rod and lever by anyone without requiring skilled labor or the use of tools.

An understanding of the invention may be had from the following description taken in connection with the accompanying drawings, in which, Fig. 1 is an elevation showing the pivot joint between a brake rod and the brake lever to which it is pivotally connected, the silencing device being shown applied thereto.

Fig. 2 is a section substantially on the plane of line 2—2 of Fig. 1 looking in the direction indicated by the arrows.

Fig. 3 is an under plan view of the construction shown in Fig. 1, and

Fig. 4 is a somewhat enlarged perspective view of the silencer or anti-rattler.

Like reference characters refer to like parts in the different figures of the drawings.

The brake rod 1 at an end thereof is adapted to be pivotally connected to the end of the immediate brake operating arm or lever 2, the end of the arm or lever 2 being forked to provide spaced apart sides 3 passing one at each side of the end portion of the rod 1. A pivot pin 4 passes through the sides of the fork and the brake rod, as shown, to pivotally connect the two parts together.

The silencer device which is to be applied is formed from a single length of spring wire bent substantially at its middle into a close bend so that the two wires extending from the bend lie closely adjacent each other forming a curved end portion 5 from which a straight shank 6 extends. The ends of the two parts of the wires making the shank 6 are formed into spring coils 7 wound outwardly and from the outer ends of the coils spaced apart substantially parallel side sections 8 extend, each terminating in an upwardly turned U-shaped hook 9 open at its lower side, as best shown in Fig. 4.

The device described is applied to the pivot joint construction where the brake rod 1 and the lever 2 are connected together by inserting the curved terminal or hooked portion 5 between the sides 3 of the fork and then bringing the coils 7 to bear against the end of the rod 1 and the adjacent parts or side edges of the sides 3, and the side sections 8 passing under the pivot joint and under the brake rod 1. The hooks 9 are brought to and above the rod 1 and hooked thereover as fully shown in Fig. 1.

When the device is thus applied the terminal hook portion 5 engages against the arm 2 at the upper end of the fork. The shank 6 passes between the sides 3 of the fork. The device is sprung from its normal form, as shown in Fig. 4, the coils being tensioned, the shank being bent and sprung, likewise the side sections 8. This provides a spring pressure which is exerted on the parts so as to maintain the pivot joint described snug and tight at all times even though the pivot pin 4 may be reduced by wearing while the openings in the rod 1 and the sides 3 of the fork may be enlarged. It will be understood with reference to Fig. 4 that the shank 6 normally is located at an angle to the parts 8 approximating 135°, while in Fig. 1, when attached in place for use, the angle between the parts 6 and 8 is much less than 90° showing the distortion from normal form which occurs on applying the device in place.

It is evident that the attachment of the device is very simple and can be done by hand without the use of any tools and that skilled labor is not needed in any respect. The invention has proved very practical and satisfactory. It is defined in the appended claims and is to be considered comprehensive of all forms of structure coming within their scope.

I claim:

1. In combination with a rod, an arm having a forked end, said forked end of the arm having a pivotal connection to an end of the rod, and a silencer device formed of spring material passing at one end through the fork of said arm and bearing against said arm and against the joint between said arm and rod and then extending alongside the rod for a distance, and means on the other end of said device to detachably connect with said rod.

2. In combination with a rod, an arm having a forked end, the sides of the folk passing one at each side of an end portion of said rod, a pivot pin passing through said fork and rod to make a pivot joint between them, and a tension silencing device formed of wire bent substantially at its middle point into a close bend and formed into a straight shank and curved end portion, said shank passing between the sides of the fork, outwardly wound coils at the end of the shank bearing against the joint between the rod and arm, substantially parallel straight sides extending from said coils, and hooks turned at right angles from the ends of said sides engaging over said rod whereby said shank, coils and sides are sprung from normal position and exert force upon said joint, for the purposes described.

3. In combination with a rod, an arm having a forked end, the sides of the fork passing one at each side of an end portion of said rod, a pivot pin passing through said fork and rod to make a pivot joint between them, and a tension silencing device formed of wire bent substantially at its middle point into a close bend and formed into a straight shank and curved end portion, said shank having its two wire elements in contact with each other and said shank passing between the sides of the fork, outwardly wound coils at the end of the shank bearing against the joint between the rod and arm, substantially parallel sides extending from said coils and means on the sides adapted to engage around said rod whereby said shank, coils and sides are sprung from normal position and exert force upon said joint, for the purposes described.

In testimony whereof I affix my signature.

FLOYD G. WITHROW.